(12) United States Patent  (10) Patent No.: US 8,131,101 B2
Koh  (45) Date of Patent: Mar. 6, 2012

(54) IMAGE PROCESSING METHOD AND IMAGE PROCESSING APPARATUS

(75) Inventor: Sei Koh, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 1055 days.

(21) Appl. No.: 11/915,967

(22) PCT Filed: May 24, 2006

(86) PCT No.: PCT/JP2006/310298
§ 371 (c)(1),
(2), (4) Date: Nov. 29, 2007

(87) PCT Pub. No.: WO2006/129529
PCT Pub. Date: Dec. 7, 2006

(65) Prior Publication Data
US 2010/0150466 A1   Jun. 17, 2010

(30) Foreign Application Priority Data
Jun. 2, 2005  (JP) ................................ 2005-162439

(51) Int. Cl.
*G06K 9/40*  (2006.01)
(52) U.S. Cl. ........................................ 382/264; 382/254
(58) Field of Classification Search .................. 382/168, 382/232, 254, 263–264, 305, 312, 274; 348/568
See application file for complete search history.

(56) References Cited

U.S. PATENT DOCUMENTS
6,069,979 A * 5/2000 VanMetter .................... 382/260
(Continued)

FOREIGN PATENT DOCUMENTS
EP  0 971 315 A2   1/2000
(Continued)

OTHER PUBLICATIONS

European Search Report for European Application No. 06746781. 1—1228 / 1887783 PCT/JP2006310298 dated Feb. 25, 2009.
(Continued)

*Primary Examiner* — Kanjibhai Patel
(74) *Attorney, Agent, or Firm* — Cantor Colburn LLP

(57) ABSTRACT

An object of the invention is to adequately remove a halo in an image processing method and apparatus for conversion of an image into an image suitable for image recording and displaying by compression of the dynamic range of the image. As means for solution, an image processing method that compresses the dynamic range of image data includes: an input process of inputting image data; a low frequency component calculation process of calculating, for each pixel, a low frequency component of image data inputted through the input process; an image processing process of calculating an image-processed value for each pixel, according to the below-described equation; and an output process of outputting image data including the image-processed value calculated by the image processing process. $Snp=a1 \cdot Snus+a2 \cdot (Snf-Snus)$, wherein Snp represents an image-processed value; a1 and a2 are represent factors ($0<a1<1$ and $0<a2<1$); Snus represents a low frequency component, of each pixel, calculated through the low frequency component calculation process; and Snf represents an image data value, of each pixel, inputted through the input process.

4 Claims, 8 Drawing Sheets

U.S. PATENT DOCUMENTS

| | | | |
|---|---|---|---|
| 6,407,747 B1 * | 6/2002 | Chui et al. | 345/660 |
| 7,269,300 B2 * | 9/2007 | Braun et al. | 382/298 |
| 2002/0006230 A1 | 1/2002 | Enomoto | |

FOREIGN PATENT DOCUMENTS

| | | |
|---|---|---|
| EP | 0 732 669 B1 | 1/2003 |
| JP | 6-292009 | 10/1994 |
| JP | 6-303430 A | 10/1994 |
| JP | 9-18811 | 1/1997 |
| JP | 2000-157518 A | 6/2000 |
| JP | 2002-171411 A | 6/2002 |
| JP | 2002-334329 A | 11/2002 |
| JP | 2003-337942 A | 11/2003 |

OTHER PUBLICATIONS

International Search Report for International Application No. PCT/JP2006/310298 mailed Jun. 20, 2006.

Japanese Office Action, Notice of Reasons for Refusal for Japanese Patent Application No. 2007-518926 mailed Apr. 19, 2011 with the English Translation.

* cited by examiner

FIG. 7 ( a )
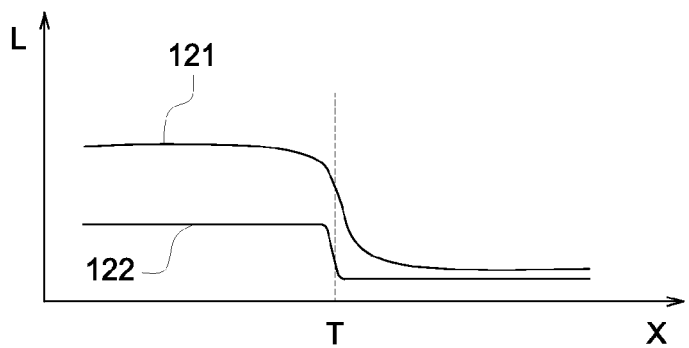
FIG. 7 ( b )
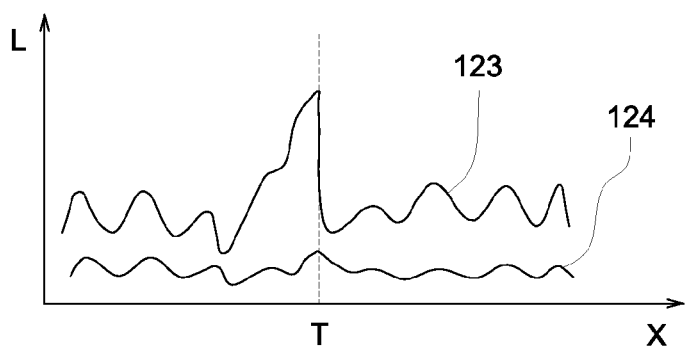
FIG. 7 ( c )
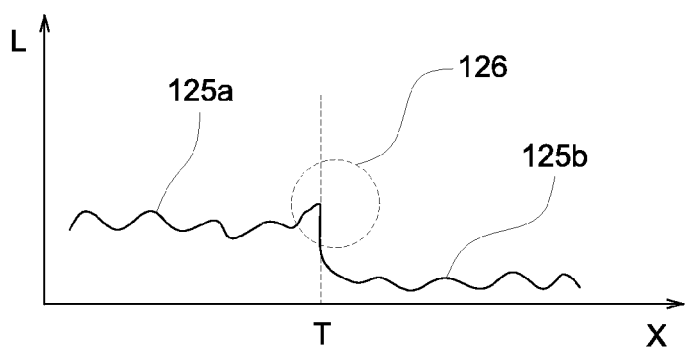

IMAGE PROCESSING METHOD AND IMAGE PROCESSING APPARATUS

CROSS REFERENCE TO RELATED APPLICATIONS

This is a U.S. national stage of application No. PCT/JP2006/310298, filed on 24 May 2006. Priority under 35 U.S.C. §119(a) and 35 U.S.C. §365(b) is claimed from Japanese Application No. 2005-162439, filed 2 Jun. 2005, the disclosure of which is also incorporated herein by reference.

TECHNICAL FIELD

The present invention relates to an image processing method and apparatus for conversion of an image into an image suitable for image recording and display by compressing the dynamic range of the image.

TECHNICAL BACKGROUND

In the field of color photographing and medical imaging, recent improvement in performance of computers, mass-storage of storage devices, and reduction in cost have achieved a wide use of methods that read an image as digitized image data by use of a digital camera or image reading device, store the image in a storage device and perform appropriate image processing, and thereafter record the image data as a hard copy on a film or printing paper or visualize the image on a display device.

In recent years, improvement in performance of solid image pickup devices, such as CCD (Charge Coupled Device) image sensor or CMOS (Complementary Metal-Oxide Semiconductor) image sensors and development of application technology of these have enabled obtaining image signals having a wide dynamic range comparable to a transparent recording medium such as a film.

On the other hand, regarding image recording, in a case of a reflection type recording medium, such as printing paper or plain paper, the reproducible dynamic range is not so wide as a transparent recording medium as described above. Also, regarding image display, a dynamic range that display devices using a CRT (Cathode Ray Tube) or liquid crystal can reproduce is hardly comparable to the dynamic range of a transparent recording medium, although it depends on the illumination conditions of an environment where they are used.

It is necessary to compress a dynamic range so as to display or record an image by a display device or recording device capable of reproducing such limited a dynamic range.

As a conventional technology for such compression, a method is widely used which performs computation, such as well known smoothing filter processing, on image data so as to separate the base component being the low frequency component and the detail component being the high frequency component, compresses only the base component, and thereafter synthesize the base component with the detail component again.

To extract the base component, widely used is a method that, for each pixel, makes the average value of a target pixel and pixels within a predetermined region around the target pixel is set as the base component of the each pixel.

The detail component is generally obtained by subtracting the base component Su from a value Sf being the value of the target pixel, the value taken before image processing.

That is, representing the image data before image processing by Sf, the image data after image processing by Sp, and the base component by Sus, and setting a factor "a" to a smaller value than 1, the dynamic range of the image is compressed according to the following equation: Sp=a·Sus+(Sf−Sus). Herein, each of Sp, Sf and Sus represents entire image data in the above described equation, and the respective components are represented by Snp, Snf and Snus for representing the value of each pixel of respective image data in the description hereinafter. The character "n" is an integer starting with 1 and ending with the total number of pixels of the image.

Regarding the base component Sus, in a well known method, for the value Snf of each pixel of image data Sf before image processing, the average value of the each pixel and neighboring pixels in a predetermined region around the each pixel is assigned to the value Snus being the base component of the each pixel. However, this method has a problem, as described below, in compressing the dynamic range of an image. This will be described, referring to FIG. 2 and FIG. 3.

Horizontal axis X in FIG. 2 represents positions along a line passing through a portion T with a steep change in luminance on an original image, and vertical axis L represents the values of image data, the values representing the luminances at the above described respective positions. Such a portion with a steep change in luminance is hereinafter referred to as an edge portion. In the image data of the example shown in FIG. 2, the left side is a light portion and the right side is a dark portion, with T on X axis being the boundary. Incidentally, luminance or density is used as a unit representing the light and dark of an image, and density is generally used for an image recorded as a hardcopy on a film, printing paper or plain paper. In both of a case of reading such an image by an image reading device and a case of visually observing such an image, when an image is irradiated under certain irradiating conditions, the density and luminance of each pixel of the image has a certain relationship therebetween. Accordingly, the light and dark of an image will be described in terms of luminance.

A curve 101 in FIG. 2(a) represents values of image data, namely represents the luminance of an original image. The curve 101 is separated into a light portion 101a and a dark portion 101b, with T on X-axis being the boundary. Also in the description below, in a case of describing image data with separation between the light portion and the dark portion, the light portion will be described given "a" and the dark portion will be described given "b", added to a symbol representing the image data.

A curve 102 in FIG. 2(b) represents the base component of image data obtained by smoothing processing, as described above. In the description below, a value of image data representing a luminance will be also referred to as a luminance value.

A curve 103 in FIG. 2(C) represents the detail component of the luminance value of the original image, and is obtained by subtracting the base component 102 from the original image data 101.

FIG. 3 illustrates the image compression method of the above described conventional technology. A curve 105 in FIG. 3(a) represents a base component after image processing obtained by multiplication of the base component Sus in FIG. 2(b) and a factor "a" smaller than 1, and the curve 103 in FIG. 3(b) represents the same detail component (Sf−Sus) as the detail component, shown in (C) of FIG. 2, of the original document.

A curve 106 (a light portion 106a or dark portion 106b) in FIG. 3(C) represents image data obtained by adding the base component 105 after image processing and the above described detail component 103. As shown by a portion 107 at the boundary between the light portion and dark portion, a portion with a high luminance value occurs which is not observed in the original image. This occurs because the base component 102 obtained by the above described image processing method, shown in FIG. 2(b), has been made dull, compared with the original base component 104 shown by an alternate long and two short dashes line, by the smoothing processing, and thus the value (Sf−Sus) in Sp=a·Sus (Sf−Sus) after image processing has become larger at the edge portion.

The portion 107 where the luminance value is large, in FIG. 3(C), is a phenomenon that appears in an actual image and is called a halo. This phenomenon will be described, referring to FIG. 4. FIG. 4(a) is a schematic diagram of a photograph before image processing, and FIG. 4(b) is a schematic diagram of a photograph which is a print out of an image obtained by performing image processing on the above described photograph, according to the above described, equation, and thereby compressing the dynamic range. FIG. 4, FIG. 6, and FIG. 8 to be referred to later are all schematic diagrams of photographs. These figures illustrate the effects of image processing on actual images, and are not aimed at indicating the levels of luminance nor quantitative spatial changes.

The photograph, in FIG. 4(a), has a gray floor of which color is closer to black, namely, the dark portion of which luminance is shown by 101b in FIG. 2(a) and a light gray wall, namely, the light portion of which luminance is shown by 101a in FIG. 2(a), and has a wide dynamic range because a light is burning at a corner of the room. Arrow X shown from the wall on the right side to the floor in FIG. 4(a) corresponds to X-axis of FIG. 2, and the position where arrow X passes through the boundary between the floor and the wall is a position T that shows the boundary between the light portion and the dark portion in FIG. 2. Likewise, also in the schematic diagrams of photographs described below, arrows X shown in the same position are corresponding to the respective vertical axes X in FIGS. 3, 5, and 7, and the wall on the right side corresponds to the respective light portions in FIGS. 3, 5 and 7, while the floor corresponds to the respective dark portions in FIGS. 3, 5 and 7.

A vicinity 107 of the portion where the wall and the floor contact with each other, the vicinity 107 being on the wall side, is lighter than other portions of the wall, and corresponds to the portion 107 in FIG. 3(C) of a high luminance.

For solution of a problem of occurrence of a halo due to a cause as described above, methods of reducing halo by synthesizing a detail with original pixel values instead of a base have been presented (Patent Document 1 for example). In Patent Document 1, an image processing method represented by the following equation is disclosed.

$$Sproc = Sorg + f1,2(Sus)$$

Herein, Sproc represents an image signal after image processing, Sorg represents an image signal of an original image, and f1(Sus) and f2(Sus) represent respectively monotone decreasing functions with the value of Sus being a variable. Further, an image processing method represented by the following equation is presented (Patent Document 2 for example). That is, defining a function G as G(Sorg,Sus)= A·Sorg+B·Sus+C, the equation is $$Sproc = Sorg + G(Sorg, Sus) = (A+1) \cdot Sorg + B \cdot Sus + C.$$

Herein, A and C are positive real constants, and B is a negative real constant. As shown by the above described equations, these methods do not add a base component to a detail component, but add original image data to the data component, and thus it aimed at preventing occurrence of a halo.

Patent Document 1: Japanese Unexamined Patent Application Publication TOKKAI No. H6-303430

Patent Document 2: Japanese Unexamined Patent Application Publication TOKKAI No. 2002-334329

DISCLOSURE OF THE INVENTION

Problem to be Solved by the Invention

However, the image compression methods disclosed in Patent Document 1 and Patent Document 2 use a method that enlarges the pixel value of each original pixel, and subtracts a compressed base component therefrom. By this method, halos can be decreased, but cannot be removed sufficiently. Further, as the pixel values of the original pixels are added without being compressed, the dynamic range of the processed image is also wide and cannot be compressed sufficiently. This will be described, referring to FIGS. 5 and 6.

Similarly to FIG. 2, the horizontal axis in FIG. 5 represents positions along the line that passes through a portion where the change in luminance on the original image is steep, and the vertical axis represents values of image data representing luminance at these respective positions. Similarly to FIG. 2, T indicates the boundary portion between the light portion and the dark portion, wherein the original image 111 and the base component 112 are shown in FIG. 5(a). The original image data 113 enlarged as described above is shown in FIG. 5(b), and the compressed base component 114 is shown in FIG. 5(C).

FIG. 5(d) shows a result 115 of image processing, with the light portion 115a and dark portion 115b. Although the halo is improved from the halo 107 shown in FIG. 3, it is recognized that a halo 116 remains even with this method.

FIG. 6(a) shows this phenomenon by a schematic diagram of a photograph similar to FIG. 4. Similar to FIG. 4(d), FIG. 6(a) is a schematic diagram of a result of performing the above described processing on a photograph of an image of the inside of a room having a gray floor of which color is closer to black, namely a dark portion, and a light gray wall, namely a light portion. The luminance of the wall being the light portion corresponds to the curve 115a shown in FIG. 5(d), and the luminance of the floor being the dark portion corresponds to the curve 115b shown in FIG. 5(d). The halo 116 shown in FIG. 5(d) is recognized at the vicinity, on the wall side, of the boundary between the wall and the floor.

Further, FIG. 6(b) is the luminance histogram of the image in FIG. 6(a), wherein the horizontal axis indicates luminance, and the vertical axis indicates the distributed number. The entire image, excluding the light burning at the corner, by the image processing method described above has a low contrast and is biased to a shadow portion.

In this situation, an object of the invention is to provide an image processing method and image processing apparatus for conversion of an image into an image suitable for image recording and displaying by compressing the dynamic range of the image by the use of a smoothing filter, the image processing method and apparatus being capable of sufficiently removing a halo.

Means for Solving the Problem

Objects, as described above, can be attained by the following methods and structures.
1. An image processing method that compresses a dynamic range of image data having plural pixels, including:
an input process of inputting image data;
a low frequency component calculation process of calculating, for each pixel, a low frequency component of image data inputted through the input process;
an image processing process of calculating an image-processed value for each pixel, according to the following equation: Snp=a1·Snus+a2·(Snf−Snus), wherein Sup represents an image-processed value;

Snus represents a low frequency component of each pixel calculated through the low frequency component calculation process;

Snf represents an image data value of each pixel inputted through the input process; and a1 and a2 represent factors (0<a1<1 and 0<a2<1), the factor a2 being a monotone decreasing function of (Snf−Snus); and an output process of outputting image data including the image-processed value calculated by the image processing process.

2. The image processing method of Item 1, wherein the factor a1 and the factor a2 are functions of (Snf−Snus).

3. The image processing method of Item 2, wherein the factor a1 is a monotone increasing function of (Snf−Snus).

4. The image processing method of Item 1, wherein the low frequency component is calculated by a smoothing filter through the low frequency component calculation process.

5. An image processing apparatus that compresses a dynamic range of image data having plural pixels, including:

an input unit for input of image data;

a low frequency component calculation unit for calculation, for each pixel, of a low frequency component of image data inputted through the input unit;

an image processing unit for calculation of an image-processed value for each pixel, according to the following equation: Snp=a1·Snus+a2·(Snf−Snus), wherein Snp represents an image-processed value;

Snus represents a low frequency component of each pixel calculated by the low frequency component calculation unit;

Snf represents an image data value of each pixel inputted by the input unit; and a1 and a2 represent factors (0<a1<1 and 0<a2<1), the factor a2 being a monotone decreasing function of (Snf−Snus); and an output unit for output of image data including the image-processed value calculated by the image processing unit.

6. The image processing apparatus of Item 5, wherein the factor a1 and the factor a2 are functions of (Snf−Snus).

7. The image processing apparatus of Item 6, wherein the factor a1 is a monotone increasing function of (Snf−Snus).

8. The image processing apparatus of Item 5, wherein the low frequency component calculation unit calculates the low frequency component by a smoothing filter.

Effects of the Invention

According to above Item 1 of the invention, there is presented an image processing method that compresses the dynamic range of image data including plural pixels. By this method, an image-processed value of each pixel is obtained from the value of the low frequency component of the each pixel calculated from inputted image data and the value of the each pixel of the inputted image data, and according to the following equation:

$$Snp = a1 \cdot Snus + a2 \cdot (Snf-Snus),$$

wherein factors a1 and a2 are set within the range 0<a1<1 and 0<a2<1, and a monotone decreasing function of (Snf−Snus) is defined as factor a2.

Thus, the ratio between the low frequency component Snus and the high frequency component (Snf−Snus) is properly defined, and halo is reduced.

According to Item 2, in Item 1 of the invention, functions of (Snf−Snus) are defined as factor a1 and factor a2, and thus an image processing method is presented which further reduces halo.

According to Item 3, in item 2 of the invention, a monotone increasing function of (Snf−Snus) is defined as factor a1, an thus an image processing method is presented which further reduces halo.

According to Item 4, in Item 1 of the invention, an image processing method is presented which allows easy extraction of the base component and the detail component of an image.

According to Item 5 of the invention, there is presented an image processing apparatus that includes an image processing unit that compresses the dynamic range of image data including plural pixels, and a unit that obtains an image-processed value of each pixel from the value of the low frequency component of the each pixel calculated from inputted image data and the value of the each pixel of the inputted image data, and according to the following equation:

$$Snp = a1 \cdot Snus + a2 \cdot (Snf-Snus),$$

wherein factors a1 and a2 are set within the range 0<a1<1 and 0<a2<1, and a monotone decreasing function of (Snf−Snus) is defined as factor a2.

Thus, the ratio between the low frequency component Snus and the high frequency component (Snf−Snus) is properly defined, and halo is reduced.

According to Item 6, in Item 5 of the invention, an image processing apparatus is presented in which functions of (Snf−Snus) are defined as factor a1 and factor a2, and thus halo is further reduced.

According to Item 7, in Item 6 of the invention, an image processing apparatus is presented in which a monotone increasing function of (Snf−Snus) is defined as factor a1, and thus halo is further reduced.

According to Item 8, in Item 5 of the invention, an image processing apparatus is presented which allows easy extraction of the base component and the detail component of an image.

BRIEF DESCRIPTION OF THE DRAWINGS

FIG. 4(a) schematically shows a case where an image processing method illustrated in FIG. 2a-2c and FIG. 3a-3c is applied to an actual image;

FIG. 4(b) schematically shows a case where an image processing method illustrated in FIG. 2a-2c and FIG. 3a-3c is applied to an actual image;

FIG. 4(c) schematically shows a case where an image processing method illustrated in FIG. 2a-2c and FIG. 3a-3c is applied to an actual image;

FIG. 7(a) illustrates that occurrence of halo can be prevented as a result of applying the image processing method in Embodiment 1 in accordance with the invention;

FIG. 7(b) illustrates that occurrence of halo can be prevented as a result of applying the image processing method in Embodiment 1 in accordance with the invention;

FIG. 7(c) illustrates that occurrence of halo can be prevented as a result of applying the image processing method in Embodiment 1 in accordance with the invention;

Figure 1:
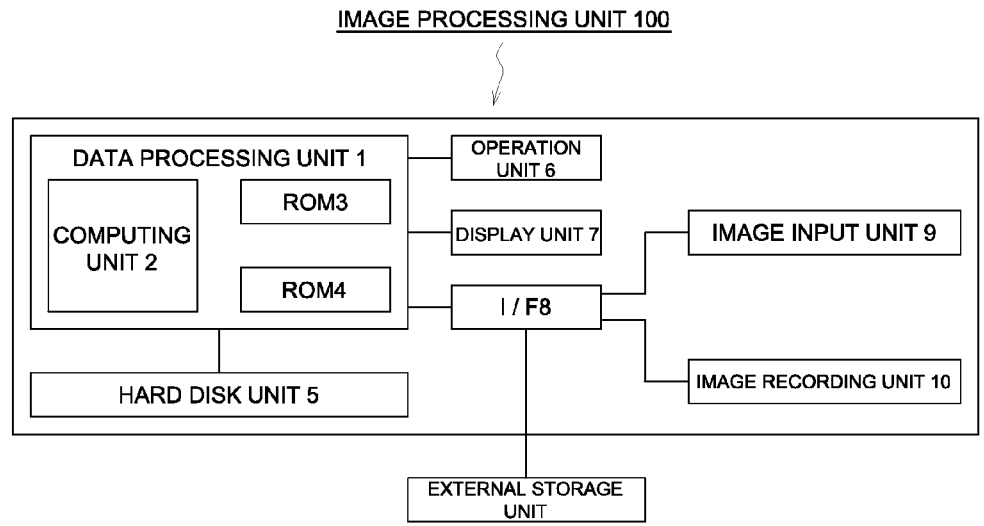
FIG. 1 is a function block diagram showing an overall structure of an image processing apparatus in accordance with the invention.

DESCRIPTION OF REFERENCE SYMBOLS 1 data processing unit
2 computing unit
3 ROM
4 RAM
5 hard disk unit
6 operation unit
7 display unit
8 interface
9 image input unit
10 image recording unit
100 image processing apparatus
101 image data indicating luminance of original image
115 image data image-processed by an example of conventional technology
125 image data image-processed by an example of image processing method in accordance with the invention
135 image data image-processed by another example of image processing method in accordance with the invention
T boundary between light portion and dark portion

BEST MODE FOR PRACTICING THE INVENTION

First, an example of a structure for practicing the invention will be described, referring to FIG. 1. FIG. 1 is a diagram showing an image processing apparatus 100 that executes an image processing method in accordance with the invention. The image processing apparatus 100 includes a dada processing unit 1, computing unit 2 as a part of the data processing unit 1, read only memory (hereinafter, also referred to as a ROM) 3, random access memory (hereinafter, also referred to as a RAM) 4, hard disk unit 5 for storing data of a large capacity, operation unit 6 for operation of image processing, display unit 7 for displaying an operation menu necessary for result and operation of image processing, an interface (hereinafter, also referred to as an I/F) for delivery of a control signal necessary for an image signal or control, image input unit 9, image recording unit 10, and the like.

The data processing unit 1 computes the low frequency component of image data, and computes an image processed value by the image processing method in accordance with the invention from the computed low frequency component and the high frequency component obtained by subtracting the low frequency component from the image data. Usually, the data processing unit 1 executes computation by a computation unit 2 of the data processing unit 1 and a program incorporated into the computation unit 2. For an image processing apparatus that is required to process a large amount of image data at a high speed, the data processing unit 1 may include an extra hardware as a component thereof to execute computation.

ROM 3 stores fixed values necessary for above described computation and for control accompanying the computation. RAM 4 temporarily holds processed values obtained in the above described computation process, and stores valuable values necessary for control accompanying the computation. The hard disk unit 5 stores mass image data, such as image data before image processing and image data obtained as a result of image processing. However, without limited to a hard disk unit, any kind of storage unit may be used as long as it has a storage capacity and processing speed which attain the above described purpose. The image input unit 9 is an example of means for input of image data, wherein, for example, an image reading unit using a digital camera or CCD line sensor, or the like can be used. Means for storing data having been digitized as image data, which transmits the digitized data to the data processing unit 1 through I/F 8, may be employed.

The image recording unit 10 is an example of means for output of image data, and for example, an inkjet printer or color laser printer can be used. Means for output of image data is not limited to such a type as to print hard copies, and may be a mass storage unit for storing image data processed by the data processing unit 1 for a long time period.

Embodiments of the present invention will be described below, referring to the drawings.

Embodiment 1

In Embodiment 1, image processing is performed by the following equation;

$$Snp = a1 \cdot Snus + a2 \cdot (Snf - Snus)$$

representing an image processing method in accordance with the invention.

Herein, (Snf−Snus)=Snd represents the detail component,

Sndmin represents the minimum of Snd, and

Sndmax represents the maximum of Snd, while factor a1 is defined to be a monotone increasing function of Snd:

$$a1=0.1 \cdot ((Snd-Snd\text{min})/(Snd\text{max}-Snd\text{min}))+0.2,$$

and factor a2 is defined to be a monotone decreasing function of Snd:

$$a2=0.5 \cdot (1.0-(Snd-Snd\text{min})/(Snd\text{max}-Snd\text{min}))+0.1.$$

Figure 2:
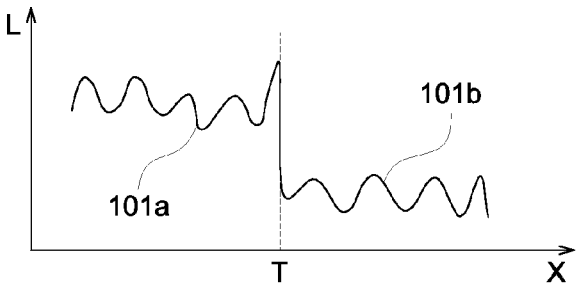
FIG. 2(a) illustrates a method of extracting a base component and a detail component of an image including an edge portion by a conventional and well known smoothing processing.
FIG. 2(b) illustrates a method of extracting a base component and a detail component of an image including an edge portion by a conventional and well known smoothing processing.
FIG. 2(c) illustrates a method of extracting a base component and a detail component of an image including an edge portion by a conventional and well known smoothing processing.
Figure 2:
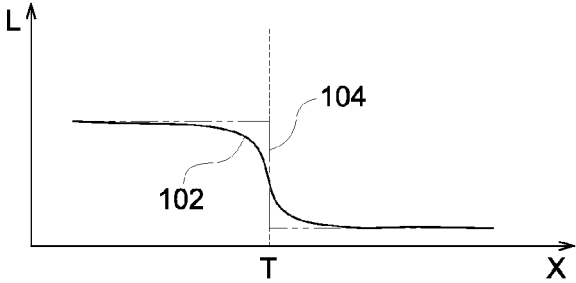
Figure 2:
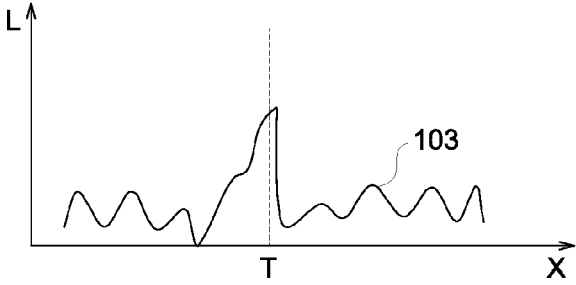
Figure 3:
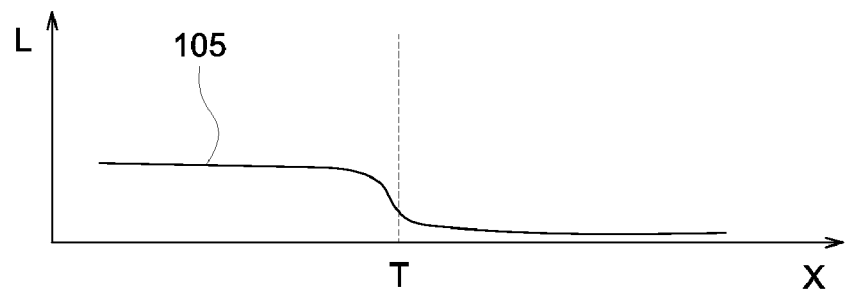
FIG. 3(a) illustrates an occurrence of a halo as a result of compressing the base component, of the image, extracted as shown in FIG. 2a-2c so as to compress the dynamic range of the image.
FIG. 3(b) illustrates an occurrence of a halo as a result of compressing the base component, of the image, extracted as shown in FIG. 2a-2c so as to compress the dynamic range of the image.
FIG. 3(c) illustrates an occurrence of a halo as a result of compressing the base component, of the image, extracted as shown in FIG. 2a-2c so as to compress the dynamic range of the image.
Figure 3:
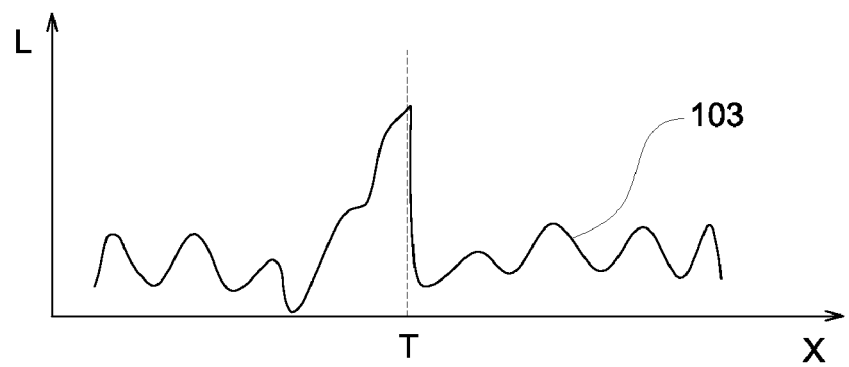
Figure 3:
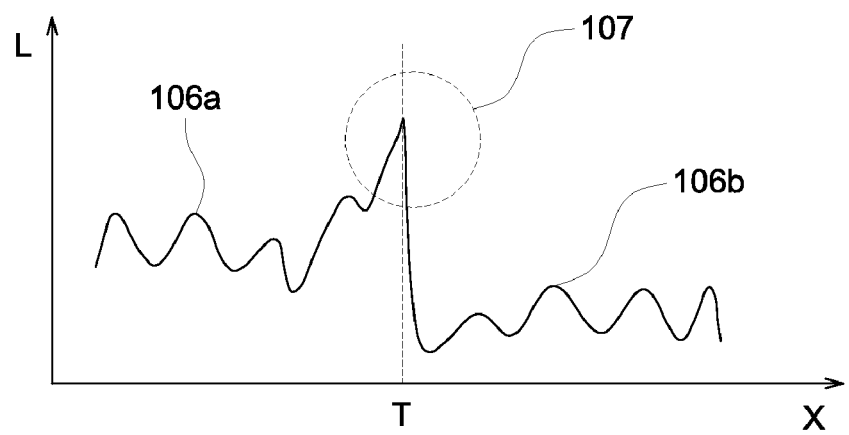

A result of image processing, described above, will be described, referring to FIGS. 7 and 8. Similarly to FIG. 2, the horizontal axis in FIG. 7 indicates positions along a line passing through the portion of which luminance varies steeply on the original image. The vertical axis in FIG. 7 indicates the values of image data indicating luminance at the respective positions thereof. Similarly to FIG. 2, in FIG. 7, T indicates X coordinate at the boundary between the light portion and the dark portion. FIG. 7(a) shows a base component 121 of the original image and a base component 122 compressed by the above described image processing method.

As described above, by defining the factor a1 as a monotone increasing function of the detail value Snd of the original image, the value of factor a1 is large on the left side in the vicinity of the boundary portion T in the figure where Snd is large, in other words, the compression ratio is small, and the value of a1 is small on the right side in the vicinity of the boundary portion T where Snd is small, in other words, the compression ratio is large. Accordingly, the compressed base component a1·Snus is in a shape having a sharp edge, as shown as 122. FIG. 7(b) shows the detail component 123 of the original image data, and the detail component 124 processed by the above described image processing method.

As described above, by defining factor a2 as a monotone decreasing function of the detail value Snd of the original image, the value of factor a2 is small, in other words, the compression ratio is large on the left side in the vicinity of the boundary portion T where Snd is large in the figure, and the value of factor a2 is large, in other words, the compression ration is small on the right side in the vicinity of the boundary portion T where the detail value of the original image is small in the figure.

FIG. 7(C) shows an image processed result of the portion 125 (light portion 125a and dark portion 125b), which is obtained by adding the values of 122 in FIG. 7(a) and 124 in FIG. 7(b). At the portion enclosed by dashed circle 126 in the vicinity of the boundary T between the light portion and dark portion, a slight increase in luminance is recognized. However, it is observed that the halo is improved in comparison with the halo 116, shown in FIG. 5.

Figure 4:
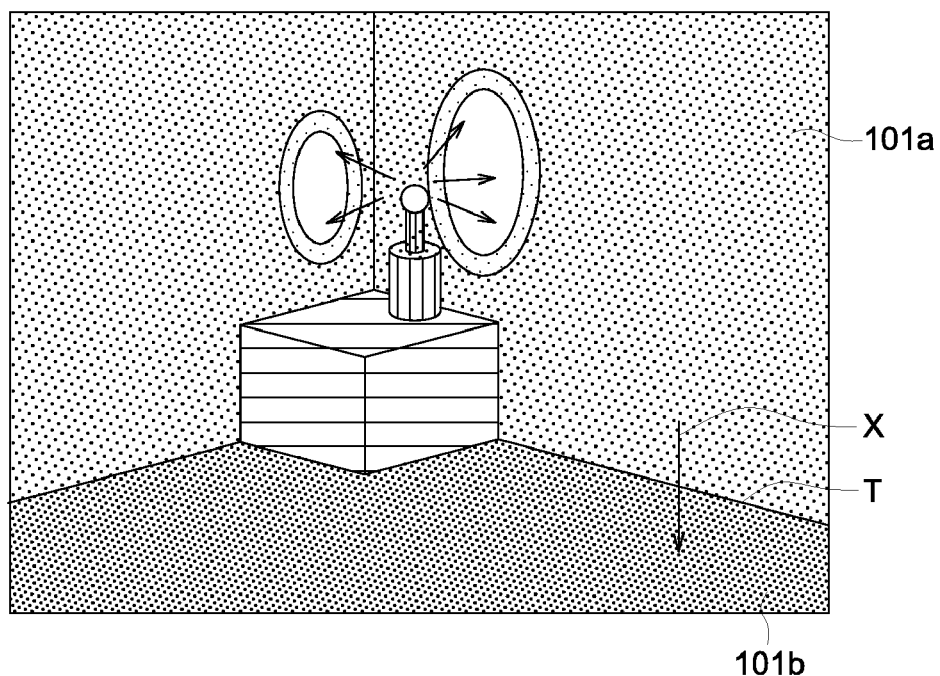
Figure 4:
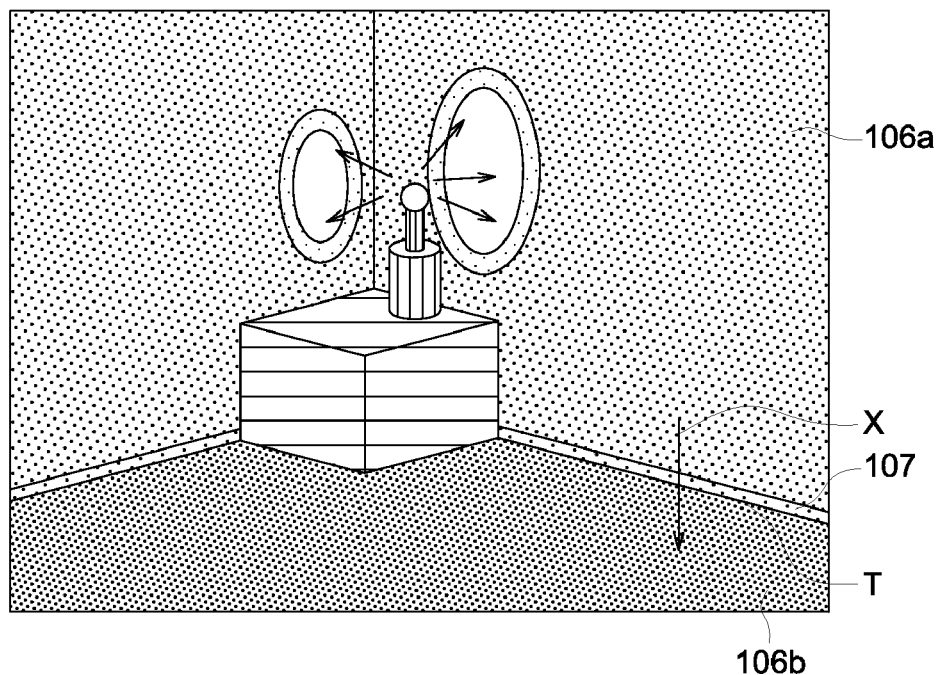
Figure 6:
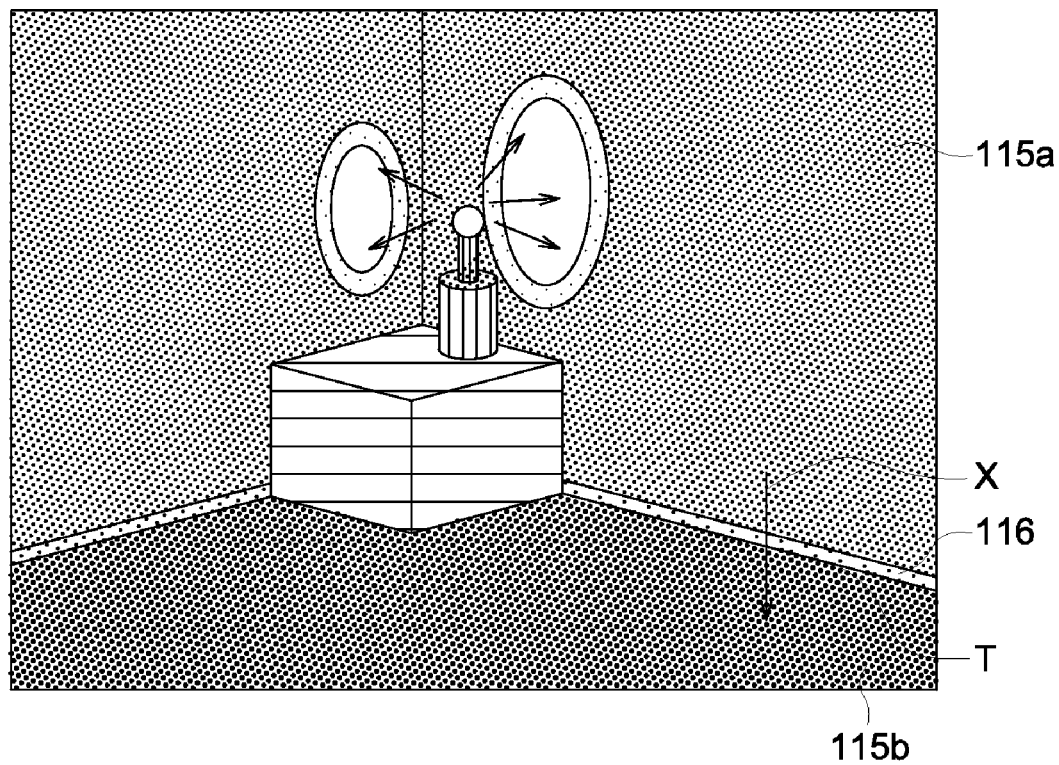
FIG. 6(a) schematically shows a case where the image processing method illustrated by FIG. 5a-5d is applied to an actual image.
FIG. 6(b) schematically shows a case where the image processing method illustrated by FIG. 5a-5d shows a luminance histogram.
Figure 6:
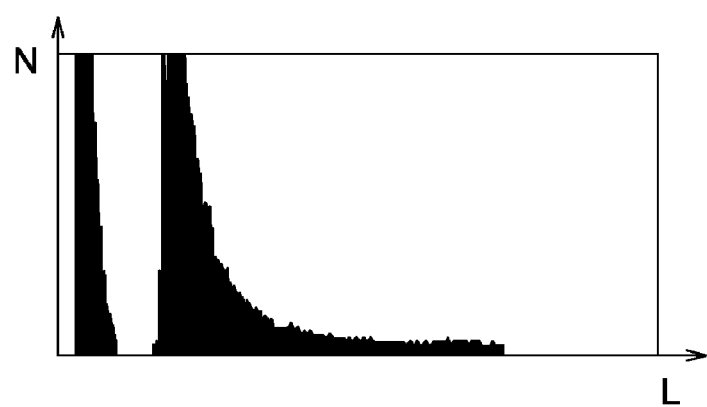

Similarly to FIG. 4(a), FIG. 8(a) shows this state with an actual image, and is a schematic diagram showing a result of performing the above described processing on a photograph taken by picking an image of the inside of the room having a gray floor of which color is closer to black, namely, the dark portion, and a light gray wall, namely, the light portion. A halo, as seen in FIG. 6, is not observed on side light portion side in the vicinity of the boundary T between the light portion 125a and the dark portion 125b.

Further, FIG. 8(b) is a luminance histogram of the image in FIG. 8(a), and it is observed that the entire image excluding the light burning at the corner is an image with good contrast without being biased to the shadow portion nor the highlight portion.

Embodiment 2

In Embodiment 2, image processing is performed by the equation:

$$Snp=a1 \cdot Snus+a2 \cdot (Snf-Snus)$$

representing an image processing method in accordance with the invention with factor a1=0.3 and factor a2=0.1.

Figure 9:
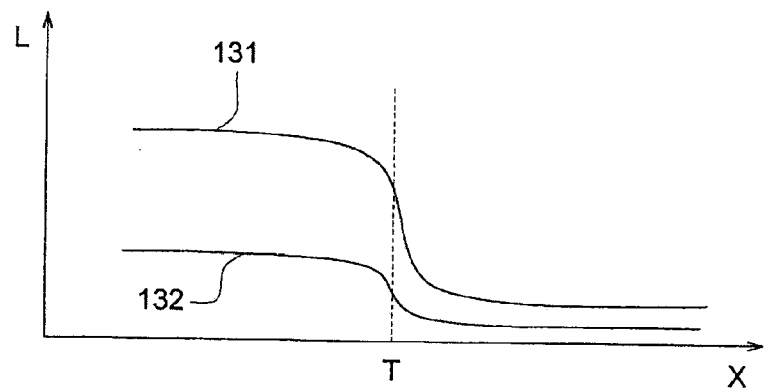
FIG. 9(a) illustrates that occurrence of halo can be prevented as a result of applying the image processing method in Embodiment 2 in accordance with the invention.
FIG. 9(b) illustrates that occurrence of halo can be prevented as a result of applying the image processing method in Embodiment 2 in accordance with the invention.
Figure 9:
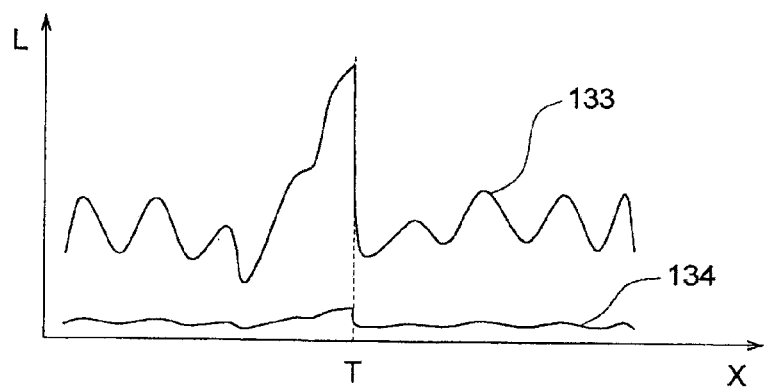
Figure 9:
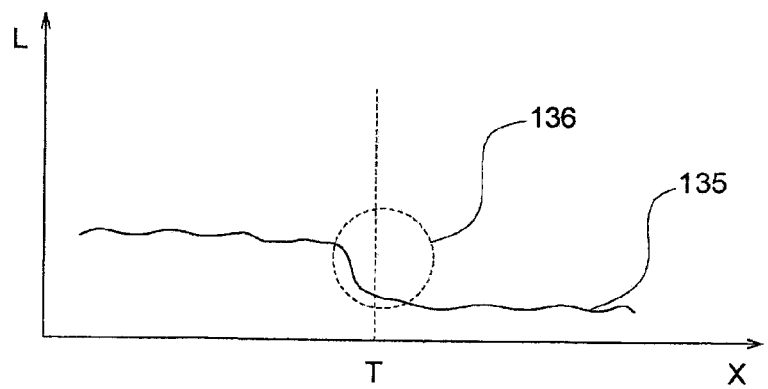

A result of image processing, described above, will be described, referring to FIG. 9. Similarly to FIG. 7, the horizontal axis in FIG. 9 indicates positions along a line passing through the portion of which luminance changes steeply on the original image. The vertical axis in FIG. 9 indicates the values of image data indicating luminance at the respective positions thereof. In FIG. 9, T indicates the boundary between the light portion and the dark portion, similarly to FIG. 7, FIG. 9(a) shows a base component 131 of the original image and a base component 132 compressed by the above described image processing method. As described above, the base component is compressed by setting the factor a1 to 0.3.

FIG. 9(b) shows a detail component 133 of the original image data, and a detail component 134 processed by the image processing method described above. By setting factor a2 to 0.1, the detail value of the original data is compressed by a large compression ratio.

Figure 5:
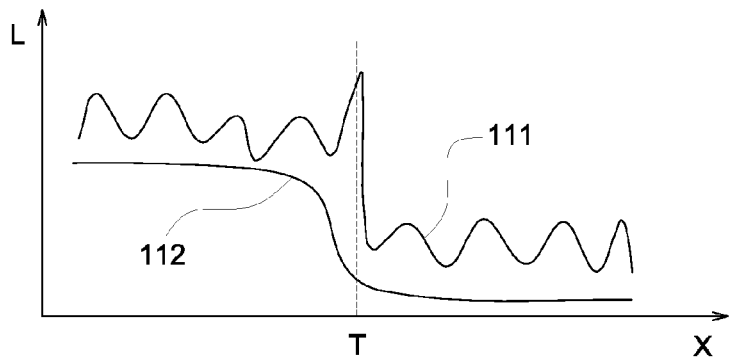
FIG. 5(a) illustrates a method disclosed in Patent Document 1 and Patent Document 2.
FIG. 5(b) illustrates a method disclosed in Patent Document 1 and Patent Document 2.
FIG. 5(c) illustrates a method disclosed in Patent Document 1 and Patent Document 2.
FIG. 5(d) illustrates a method disclosed in Patent Document 1 and Patent Document 2.
Figure 5:
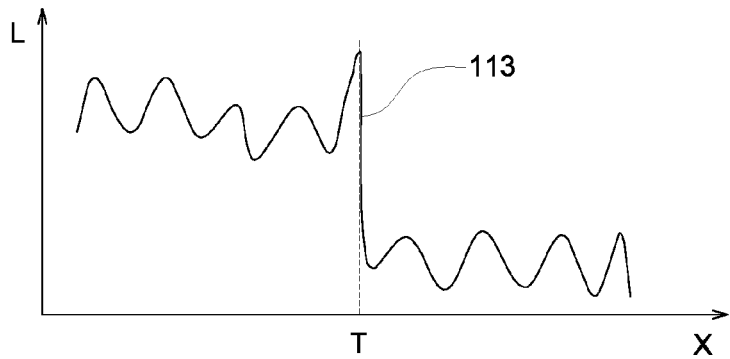
Figure 5:
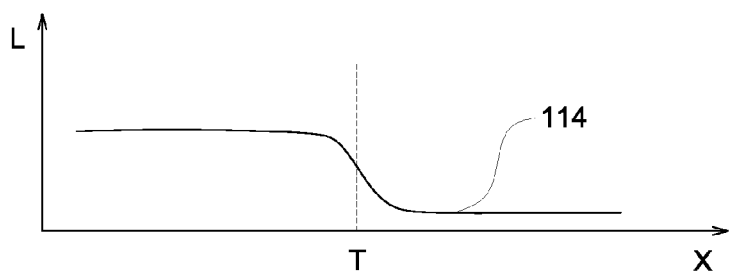
Figure 5:
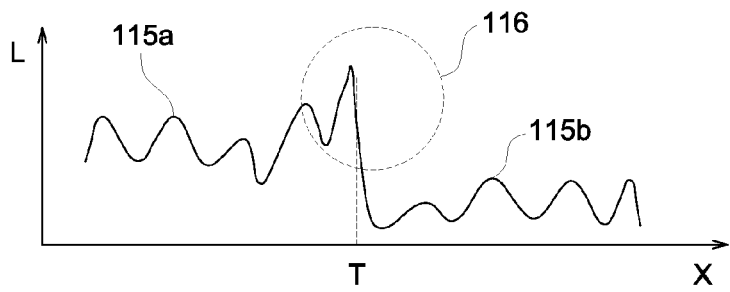

FIG. 9(c) shows a result 135 of image processing, which is obtained by adding a base component 132 in FIG. 9(a) and the detail component 134 in FIG. 9(b). At the portion enclosed by dashed circle 136 in the vicinity of the boundary T between the light portion and dark portion, increase in luminance from that at the light portion is not observed, namely, it is understood that halo, as shown in FIG. 5, does not occur.

Figure 8:
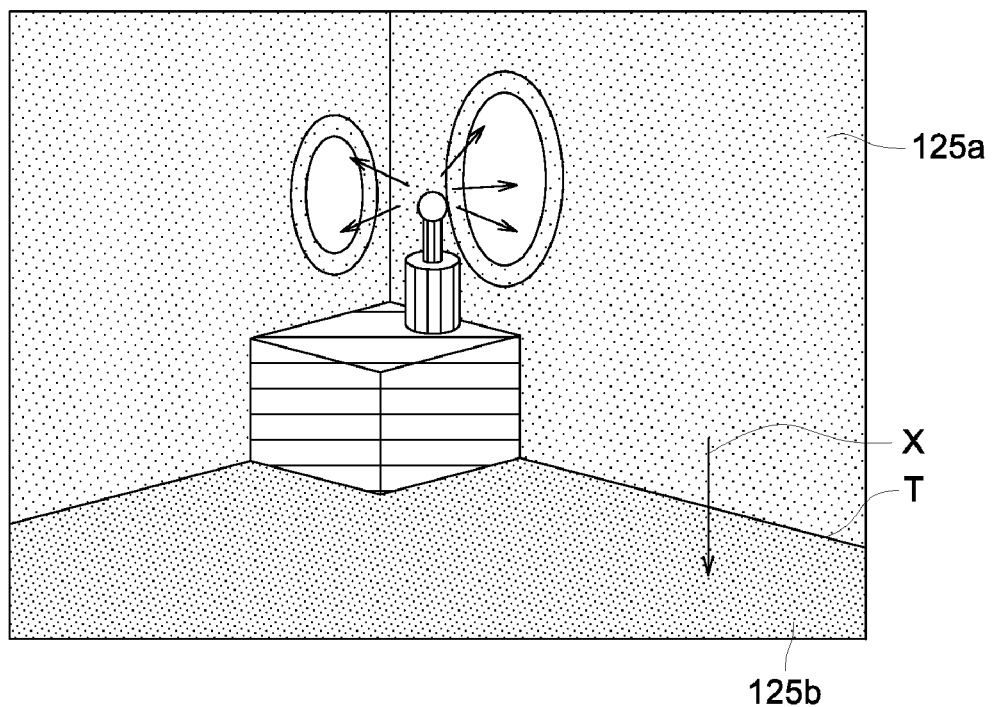
FIG. 8(a) schematically shows a case where the image processing method illustrated by FIG. 7a-7c is applied to an actual image FIG. 8(b) schematically shows a case where the image processing method illustrated by FIG. 7 shows a luminance histogram.
Figure 8:
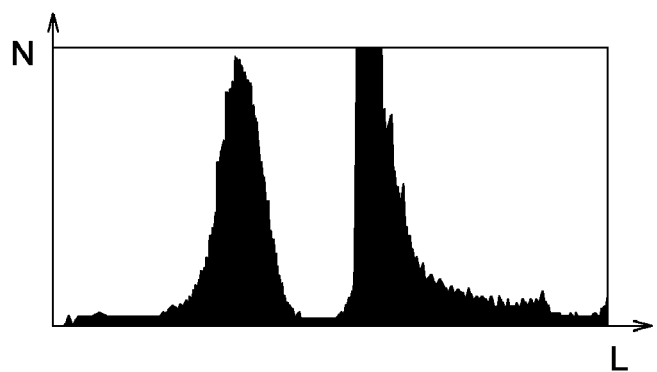

Both in FIG. 7 and FIG. 9, there is no phenomenon that the luminance value, indicated by the vertical axis, becomes larger at the boundary between the light portion and the dark portion than the luminance value of the light portion. Accordingly, also in Embodiment 2, it is understood that halo does not occur, similarly to the schematic diagram of the result of image processing on an actual image, as shown in FIG. 8.

Needless to say, an object of the invention can be attained also in such a manner that a system or an apparatus is provided with a storage medium storing a program of software that realizes the functions in the above described embodiments, and a computer (a CPU or MPU) being a controller of the system or apparatus reads and executes the program stored in the storage medium.

In this case, the program, which is read from the storage medium, itself realizes the functions in the above described embodiments, and the program and the storage medium storing the program constitute the invention.

As the storage medium for providing the program, it is possible to use, for example, a floppy® disk, hard disk, optical disk, optical-magnetic disk, CD-ROM, CD-R, magnetic tape, nonvolatility memory card, ROM, or the like.

Further, needless to say, by executing the program read by the computer, not only the functions in the above described embodiments are realized, but also, the invention covers a case where OS (operating system) and the like operating on the computer perform actual processing partially or totally, upon instructions by the program, and the functions in the above described embodiments are realized thorough the processing.

Further, needless to say, the invention includes a case where, after the program read from the storage medium is written into a function expansion board inserted in the computer or into a memory provided in a function expansion unit connected to the computer, a CPU and the like provided on the function expansion board or in the function expansion unit perform actual processing partially or totally, upon instructions by the program, and the functions in the above described embodiments are realized thorough the processing.

Still further, also regarding detailed structures and detailed operations of respective structures that constitute an image processing apparatus in accordance with the present invention, changes and modification may be properly made without departing from the spirit of the invention.

The invention claimed is:

1. An image processing method that compresses a dynamic range of image data having plural pixels, comprising:
   inputting image data;
   calculating, for each pixel, a low frequency component of image data inputted through the input process;
   calculating an image-processed value for each pixel, according to the following equation: $Snp = a1 \cdot Snus + a2 \cdot (Snf - Snus)$, wherein
   Snp represents an image-processed value;
   Snus represents a low frequency component, of each pixel, calculated through the low frequency component calculation process;
   Snf represents an image data value, of each pixel, inputted through the input process; and
   a1 and a2 represent factors ($0 < a1 < 1$ and $0 < a2 < 1$), wherein the factor a1 is obtained by a monotone increasing function of (Snf−Snus) and the factor a2 is obtained by a monotone decreasing function of (Snf−Snus); and
   outputting image data including the image-processed value calculated by the image processing process.

2. The image processing method of claim 1, wherein the low frequency component is calculated by a smoothing filter through the low frequency component calculation process.

3. An image processing apparatus that compresses a dynamic range of image data having plural pixels, comprising:
   an input unit for input of image data;
   a low frequency component calculation unit for calculation, for each pixel, of a low frequency component of image data inputted through the input unit;
   an image processing unit for calculation of an image-processed value for each pixel, according to the following equation: $Snp = a1 \cdot Snus + a2 \cdot (Snf - Snus)$, wherein
   Snp represents an image-processed value;
   Snus represents a low frequency component, of each pixel, calculated by the low frequency component calculation unit;
   Snf represents an image data value, of each pixel, inputted through the input unit; and
   a1 and a2 represent factors ($0 < a1 < 1$ and $0 < a2 < 1$), wherein the factor a1 is obtained by a monotone increasing function of (Snf−Snus) and the factor a2 is obtained by a monotone decreasing function of (Snf−Snus); and
   an output unit for output of image data including the image-processed value calculated by the image processing unit.

4. The image processing apparatus of claim 3, wherein the low frequency component calculation unit calculates the low frequency component by a smoothing filter.

* * * * *